Feb. 3, 1970  G. T. DAUGHTERS II, ET AL  3,493,772
BACTERIAL COUNTING MACHINE AND METHOD
Filed May 29, 1967  3 Sheets-Sheet 1

INVENTOR.
GEORGE T. DAUGHTERS, II.
NEIL B. INGELS JR.
BY AGOSTINO BURZIO

ATTORNEY

Feb. 3, 1970     G. T. DAUGHTERS II, ET AL     3,493,772
BACTERIAL COUNTING MACHINE AND METHOD
Filed May 29, 1967     3 Sheets-Sheet 2
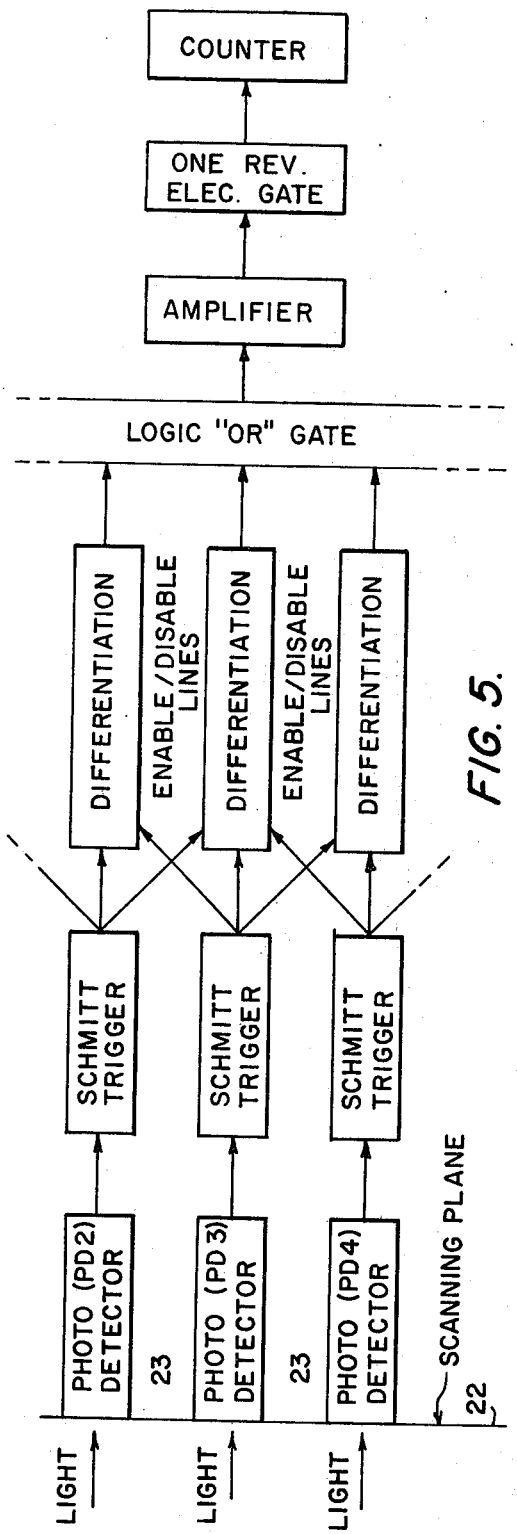
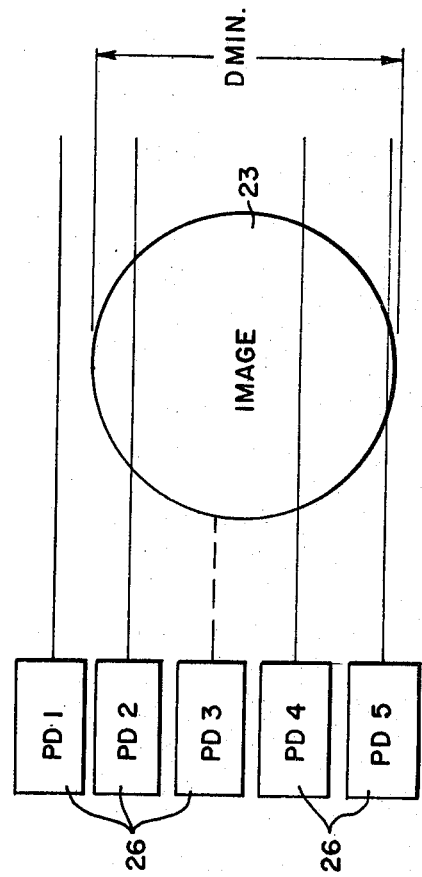
INVENTOR.
GEORGE T. DAUGHTERS, II.
NEIL B. INGELS JR.
BY   AGOSTINO BURZIO
ATTORNEY United States Patent Office 3,493,772
Patented Feb. 3, 1970

3,493,772
BACTERIAL COUNTING MACHINE
AND METHOD
George T. Daughters II, Mountain View, Neil B. Ingels, Jr., Palo Alto, and Agostino Burzio, San Jose, Calif., assignors to Palo Alto Medical Research Foundation, Palo Alto, Calif., a corporation of California
Filed May 29, 1967, Ser. No. 642,060
Int. Cl. H01j 39/12; G06m 7/00
U.S. Cl. 250—222      12 Claims

ABSTRACT OF THE DISCLOSURE

Bacterial colonies on a nutritive medium such as an agar surface function as lenses when light is transmitted therethrough. The light is focused in a scanning plane spaced from the agar surface with the result that the individual colonies are more discretely defined than when viewed on said surface, and imperfections in the agar surface are out of focus in said plane. Accordingly, a photosensitive counter such as a linear array of semiconductor photodevices may be moved relative to the image of the colony lenses in said plane to count accurately the colonies by electronic means.

At present, a labor-consuming and tedious operation in bacteriological analysis requires counting colonies of bacteria which grow from a solution on an agar surface in a petri dish or the like. The common means for counting such colonies is visual and manual because of two impediments to photoelectric counting which have heretofore existed. One impediment is the fact that colonies tend to overlap in irregular patterns and reasonably accurate machine counting has heretofore proved impossible. Thus, a judgment based on visual observation by a human operator has been the only satisfactory means of solving the problems created by this impediment. In the present invention, the bacteria colonies, being of spheroidal configuration and translucent, function as lenses focusing light passing through the petri dish and agar so that pinpoints of light are focused in a scanning plane spaced a distance beyond the agar surface. Machine counting of the pinpoints of light is much more readily accomplished in accordance with the present apparatus and method.

A second impediment to accurate machine counting is the fact that scratches, hair, dust and various other impurities commonly exist on the agar surface. Visual inspection enables the technician to distinguish between such impurities and the bacterial colonies, but heretofore it has been impossible for a simple machine to discriminate between colonies and impurities. In accordance with the present invention, the image of the colony is focused in the plane remote from the agar surface whereas the imperfections are not focused in such plane and hence accurate counting by machine is feasible without interference from such impurities.

Inasmuch as each agar plate may contain from 50 to 1,000 colonies and many plates must be counted for statistical accuracy, a considerable amount of time is presently consumed and because of the nature of the counting operation inaccuracies are likely to occur. The present invention greatly reduces the labor required in bacterial analysis and improves the accuracy thereof.

Another feature of the present invention is the fact that a simple linear array of semiconductor photodevices is used as a scanning system in the plane in which light transmitted through the lenses is focused. This feature provides a much more simple counting means than heretofore achieved.

A still further advantage of the present invention is the use of a simple, inexpensive technique to produce a single count for a single colony rather than the elaborate computer required by previous attempts at solving the problems heretofore mentioned.

A further feature of the invention is the use of an electronic circuit which insures the accuracy of the count despite the random pattern of colonies, their proximity and their overlapping relationship.

Other objects of the present invention will become apparent upon reading the following specification and referring to the accompanying drawings in which similar characters of reference represent corresponding parts in each of the several views.

In the drawings:

FIG. 4 is a schematic view showing how a single image is scanned by a plurality of photosensitive elements in the plane of FIG. 2.

FIG. 5 is a block diagram of the electronic system and

Bacterial colonies 11 are grown in order to assess the concentration of bacteria in a given solution. Typical instances of such growth are in the public health field where it is necessary to hold the bacterial contamination of water and milk below given safe levels. Periodically, bacterial concentrations are assayed in these solutions. In the research domain, bacteria are widely used as laboratory "animals" and their numbers must be accurately assayed both before and after given experimental procedures.

The original solution to be assayed is usually diluted to reduce the density of the growing colonies and a sample of the diluted solution is spread on a nutritive medium 12 of which the most common is agar with additives. After incubating the bacteria under optimum conditions of growth, each bacterium so placed reproduces many thousands of times and colonies 11 are formed which are visible to the naked eye even though the original parent bacterium was not visible. Each visible colony 11 on the agar surface 12 represents one parent bacterium, and the total number of colonies on the surface when counted represents the bacterial concentration of the original solution. Heretofore, counting colonies 11 has been an extremely tedious step done by human visual inspection with the aid of various manual counting aids. Since each plate may contain between 50 and 1,000 colonies and since many plates must be counted in order to assure statistical accuracy, the counting procedure is time consuming, physically exhausting, and inaccurate.

Figure 1:
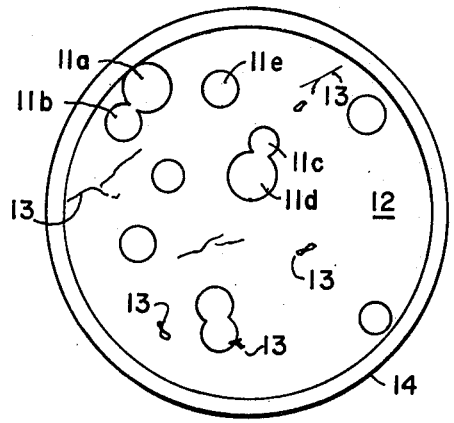
FIG. 1 is a schematic plan view of a portion of a petri dish showing a typical agar surface having a plurality of bacterial colonies, some of which are overlapping, and also having surface imperfections.

As shown in FIG. 1, a typical portion of an agar surface 12 has a plurality of colonies 11 each of approximately circular shape. Some of these colonies (e.g., 11a, 11b and 11c, 11d) overlap, and although a skilled technician can readily distinguish between a large single colony 11e and an overlap of a plurality of colonies, 11a, 11b, heretofore no simple machine has been able to accomplish such distinction. It will further be seen in FIG. 1 that surface imperfections 13 exist on the agar such as dust, scratches, hair and a multitude of surface imperfections. It is not difficult for a human to distinguish such imperfections 13 from colonies 11, but heretofore no simple machine has been able to accomplish this result.

Figure 3:
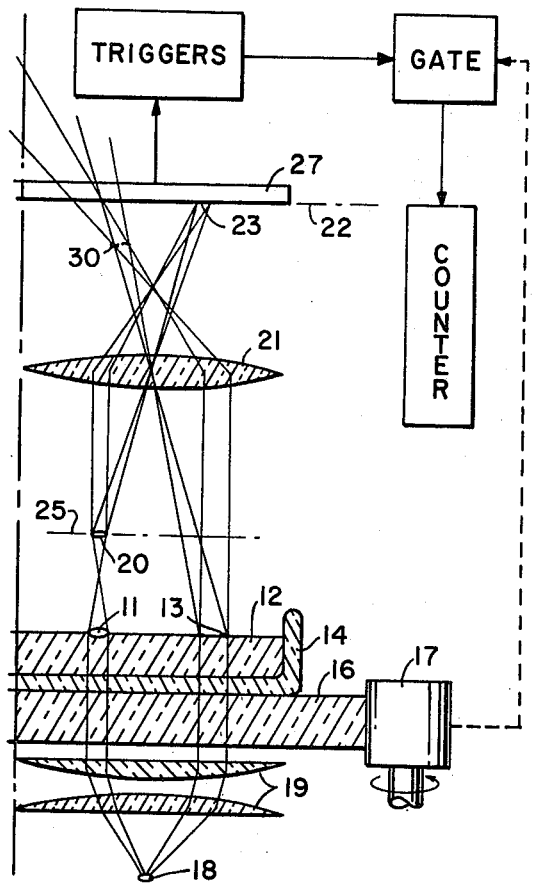
FIG. 3 is a fragmentary, schematic sectional view showing the optical and mechanical features of the system.

In accordance with the present invention, petri dish 14 having agar and additives as a gel 12 therein is positioned on rotatable transparent table 16. Table 16 may be rotated by means of pinion 17 which is turned either manually or electrically to rotate dish 14 in turn. A light source 18 such as a miniature arc lamp point source of light is located below table 16 and light from such source is preferably passed through condenser lenses 19 so that the beams therefrom are substantially parallel, and pass through the transparent table 16, the transparent petri dish 14, the translucent agar 12 and through each translucent colony 11. As shown in FIG. 3, colony 11 is spheroidal in shape and functions as a lens. Surface imperfections such as 13 are non-spheroidal and do not function as lenses but rather diffuse the light. The light passing through colony 11 is converged and focused in an image 20 in primary image plane 25 a short distance (e.g. 2 cm.) above the surface 12 of the agar, but other light, particularly that diffused by the surface imperfections 13, is not foused in said image plane, but at point 30 considerably above said plane. Preferably an auxiliary lens 21 is focused on plane 20 and the primary image 23 is focused in scanning plane 22. The greater distance between plane 22 and colony 11, as compared with the distance between plane 25 and colony 11 provides greater clearance above the agar surface, a feature which is desirable but not necessary.

The colonies 11 thus themselves transmit an intensified light level to the scanning plane 22 than does the agar. Typically, the factor of intensification is approximately 2.5. Since each individual colony is a body which has started from a single bacterium, each colony produces a separate lens and hence indiviually focuses light clearly and separately in or near the scanning plane. Multiple colonies are thus accurately resolved. By using bacterial colonies as lenses, resolution of multiple colonies and elimination of inaccuracies due to dirt, hair and scratches, and so forth, from the counting considerations is accomplished.

Figure 2:
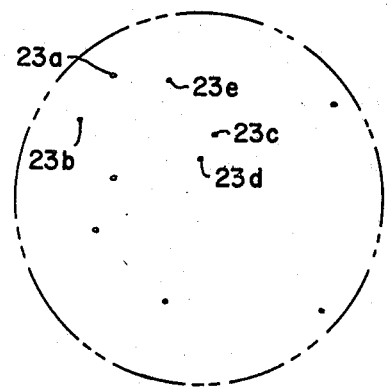
FIG. 2 is a schematic view of a plane beyond that of FIG. 1 showing how the colonies of FIG. 1 have functioned as lenses to focus in said plane light transmitted therethrough as points discrete from each other and readily countable.

Referring now to FIG. 2, showing the light images 23 in plane 22 of each colony 11, it will be seen that images 23a, 23b of colonies 11a, 11b, respectively, are discrete rather than overlaping. Visual differentiation between the images is improved over FIG. 1. More importantly, however, the images 23 of plane 22 may be electronically scanned, thereby obviating visual and manual counting.

Figure 6:
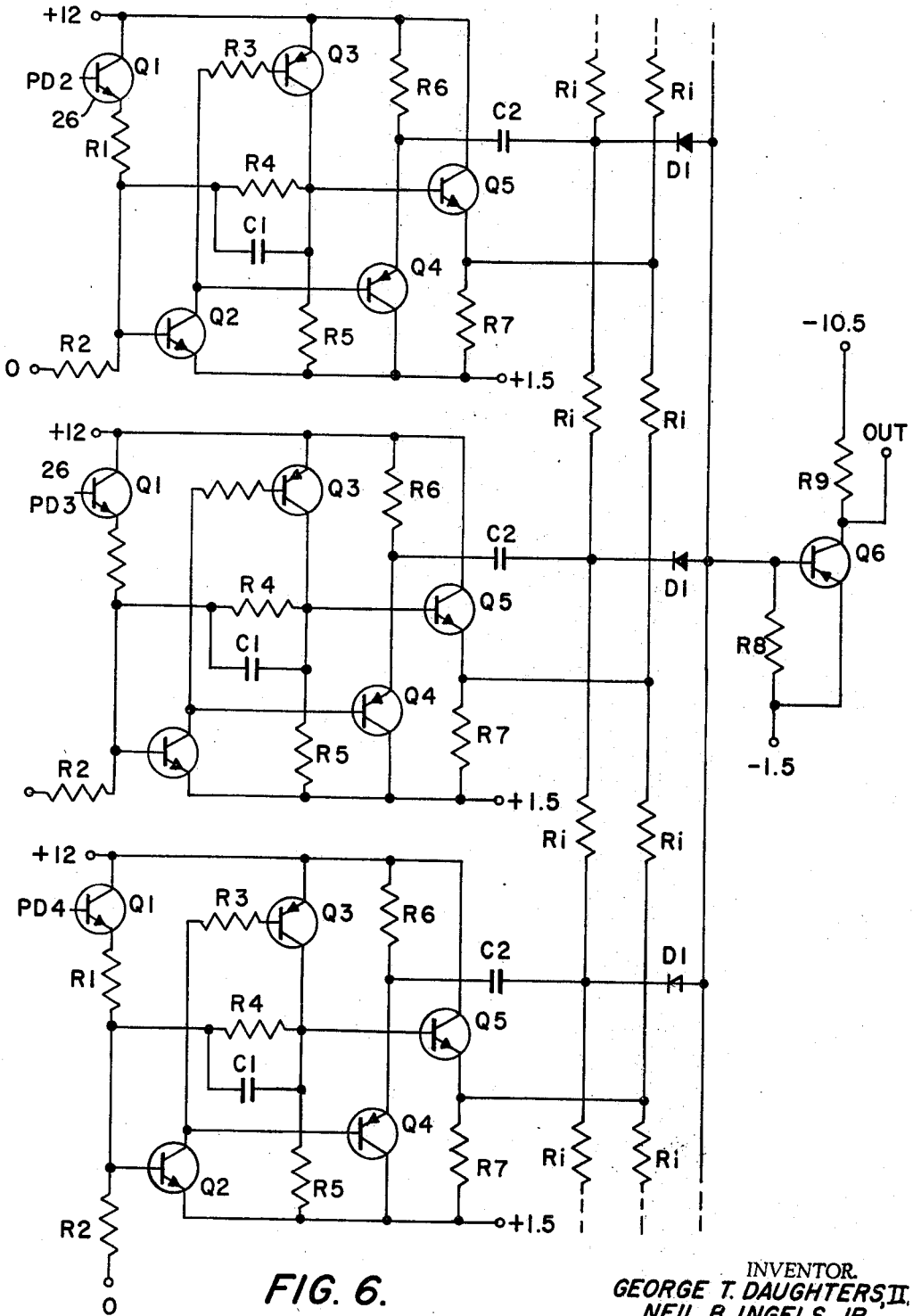
FIG. 6 is a typical electronic wiring diagram thereof.

One typical electronic means which may be employed to detect the image 23 transmitted from source 18 through petri dish 14, agar 12 and colonies 11 in the scanning plane 22, is shown in FIGS. 5 and 6, although visual inspection might still be employed. The intensity of the source 18 is adjusted so that when phototransistors 26 are in the spaces between colonies 11 typically less than 18 microamps of photocurrent flow through R-1 and R-2. This current magnitude is not sufficiently large to change the state of the Schmitt trigger circuits (consisting of Q-2, Q-3, R-3, R-4, R-5 and C-1). When the phototransistors 26 encounter the bright spots 23 representing the colonies, typically more than 20 microamps flow through R-1 and R-2, which is sufficient to change the state of the Schmitt triggers. The collector of Q-2 changes from aproximately plus 11.5 volts to plus 1.7 volts, approximately .5 microsecond after the Schmitt trigger threshold is exceded. At the same time, the collector of Q-3 rises from approximately plus 1.5 volts to approximately plus 11.8 volts. Q-4 and R-6 act simply as a power amplifier (emitter follower) for the signal from the collector of Q-2. In like manner, Q-5 and R-7 act as a power amplifier for the signal from the collector of Q-3. The signal from the emitter of Q-4 is differentiated by C-2 and R$_t$ and fed into an "or" logic circuit D-1. It is then inverted and then further amplified by Q-6, R-8 and R-9. The pulse from the collector of Q-6 is fed through a gate which is open for one revolution of table 16 into an electronic totalizer (not shown).

Besides creating this counting pulse, however, the change of state in the Schmitt trigger (hereinafter termed the "original"), also blocks the transmission of pulses generated by its two "nearest neighbor" Schmitt triggers. Very probably, due to the close spacing of phototransistors 26, these two nearest neighbor transistors 26 will encounter the image 23 of the same colony as did the original phototransistor, but at a slightly later time by reason of the curved shape of the colony. The fact that they encounter the colony at a slightly later time is the key to only one pulse being counted for each colony encountered. When the original phototransistor encounters the colony and changes the state of its associated Schmitt trigger, the D-C level of the emitter of the Q-5 in this Schmitt trigger changes from plus 1.5 volts to plus 11.8 volts. This voltage is coupled to the nearest neighbor "or" gate diodes D-1 via resistors $R_t$, back-biasing these diodes sufficiently so as to block the passage of pulses from the nearest neighbor Schmitt triggers. In this way, only the first phototransistor 26 to encounter a given image 23 of colony 11 produces a pulse which is counted. The pulses from the neighbors of the original Schmitt trigger are prevented from passing into the electronic totalizer. This technique, therefore, produces only one counted pulse per colony encountered.

Referring to FIG. 4, it will be seen that under the conditions illustrated phototransistor PD3 first encounters the image 23 of a colony. The trigger of this phototransistor blocks off the nearest neighbors PD2 and PD4 so that they do not produce an additional count when they encounter the same image an instant later. Similarly, although PD1 does not encounter the image, PD5 does encounter it and its count is blocked off by the trigger of PD4.

Figure 3A:
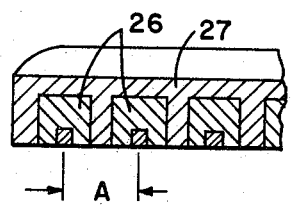
FIG. 3A is an enlarged, fragmentary sectional view showing typical phototransistors in linear array.

In the accompanying FIGS. 5 and 6, a plurality of phototransistors 26 is positioned in close side-by-side relationship. In FIGS. 3 and 3A, a linear array of semiconductor photodevices is shown. One such array is produced commercially by Fairchild Semiconductor, a division of Fairchild Camera and Instrument Corporation, fabricated in a monolithic silicon structure 27 with a plurality of phototransistors 26 of very small area of uniform light sensitivity. As a further alternative, a linear array of photodiodes, such as Fairchild Semiconductor Catalog EPA 500, Linear Integrated Photodiode Array, Silicon Planar Passivated, may be used. Other light intensity detectors whose size and geometrics are acceptable may be used.

The center-to-center spacing between photodevices is substantially less than the size ($d$ min.) of the smallest image 23 to be detected. Thus the image 23 cannot pass undetected between two photodevices 26. A preferred photodevice spacing for a typical arc lamp 18 point source of light is about .005 to .010 inch, a figure which is well within the present state of the art in array fabrication.

Each photodetector 26 in the array drives an electronic trigger circuit which produces an output pulse when the impinging light intensity exceeds a given intensity. The first detector (PD3 in FIG. 4) to encounter the image 23 of a given colony drives the pulse forming circuit to make the count and also blocks the transmission of pulses from its nearest neighbors. The nearest neighbors also block their nearest neighbors. The result of this sequence of events is that the only pulse emanating from the group of detector electronics which sees the image will be that from the first detector PD3 to encounter the image. If, under unusual circumstances, the two neighboring detectors encounter the image of the same colony at precisely the same time, each will produce a pulse since neither is inhibited, but the pulses will identically overlap in time and be recorded as a single count.

Referring now in greater detail to FIG. 3, a typical configuration of the instrument is shown. Light from source 18 of about .015 inch diameter is roughly collimated by condenser lens system 19, although such a system is not a requirement. This light is passed through petri dish 14 containing a translucent agar medium 12 which has bacterial colonies 11 growing on the surface, as well as imperfections 13, such as dirt, agar inhomogeneities, etc. The total light transmitted by the contents of the plate is converged by the auxiliary lens 21, being focused at some unimportant point. That light which passes through a typical colony 11, however, is converged due to the lens-like quality of the colony. Upon further refraction by auxiliary lens 21, a bright image 23 of the light source is brought into focus in the scanning plane 22. It is these images 23, one for each colony on the plane, which are counted. Note that a piece of dirt 13 is focused far below the desired plane 22 and is therefore badly defocused in this plane.

A complete scan of the plate can be obtained by scanning radially and rotating table 16 by means of pinion 17 to cover the entire surface in one revolution. However, an entire revolution is not necessary where other means will be sufficiently accurate. Linear scanning without rotating of the plate may be used by doubling the width of the array 27 or doubling the number of individual photodevices. Conventional petri dishes 14 are round but square and rectangular dishes may be used.

A diverging negative colonial lens requires the use of a converging auxiliary lens 21 of greater power than that required for converging colonies to form a real image. Such negative lens may occur, for example, when colonies have been destroyed, as by subjection to a virus, leaving spheroidal craters.

In FIG. 5 the means whereby the triggers of the various photodetectors block off the count from nearest neighbor photodetectors are shown diagrammatically.

In the typical wiring diagram of FIG. 6, the following table of components may be considered typical:

| | |
|---|---|
| $Q_1$ | Phototransistor, Fairchild #FPM-100. |
| $Q_2$ | Transistor 2N2484. |
| $Q_3, Q_4, Q_6$ | Transistor 2N995. |
| $Q_5$ | Transistor 2N914. |
| $D_1$ | Diode 1N456. |
| $R_1, R_2$ | Resistor, 100K, ¼ w., 10%. |
| $R_3$ | Resistor, 68K, ¼ w., 10%. |
| $R_4$ | Resistor, 1M, ¼ w., 10%. |
| $R_5, R_1$ | Resistor, 10K, ¼ w., 10%. |
| $R_6, R_7$ | Resistor, 1K, ¼ w., 10%. |
| $R_8$ | Resistor, 100, ¼ w., 10%. |
| $R_9$ | Resistor, 4.7K, ¼ w., 10%. |
| $C_1$ | Capacitor, 100 pf., disc, 10%. |
| $C_2$ | Capacitor, 1000 pf., disc, 10%. |

What is claimed is:

1. A colony counter for counting colonies of bacteria comprising a localized source of light, transparent support means, a culture medium on said support means formed on its surface with a plurality of lenses, said lenses comprising bacterial colonies or viral craters of destroyed bacteria, light sensitive viewing means for viewing in a plane spaced from said surface the images of said source focused by said lenses, and means for positioning said viewing means relative to said surface to focus light from said source refracted by said lenses relative to said viewing means.

2. A colony counter according to claim 1 which further comprises a plurality of photodevices in said plane, each delivering a pulse upon detecting an increase in light intensity caused by illumination by one such image, means for moving said devices relative to said images to scan said images, and counting means for counting the pulses of said photodevices.

3. A colony counter according to claim 1 in which said devices are spaced distances between centers less than the smallest diameter images in said plane.

4. A colony counter according to claim 3 which further comprises means for blocking off from said counting means the count of the nearest neighbor devices of the first said device illuminated by one said image.

5. A colony counter according to claim 3 in which said devices are in a linear array in a monolithic silicon structure.

6. A colony counter according to claim 1 which further comprises a lens between said support means and said devices.

7. A colony counter according to claim 1 in which said viewing means comprises a plurality of photodevices in close side-by-side array, spaced apart a distance less than the size of the smallest image to be counted; a plurality of electronic level detectors each electrically connected to one said device, a plurality of differentiators each energized by one said detector to deliver a pulse upon substantial increase in illumination of the respective photodevice, with which said detection is connected, and counting means activated by a pulse from any of said differentiators.

8. A colony counter according to claim 7 which further comprises a diode for each said differentiator, comprising an "or" gate to said counting means.

9. A colony counter according to claim 8 which further comprises an interconnection between said level detectors and the nearest neighbor level detectors to block the passage of pulses from said nearest neighbor level detectors.

10. A method of counting bacterial colonies on the surface of a culture medium comprising shining light from a localized source through said medium and said colonies, said light being focused by each said colony as an individual image of said source substantially in a plane beyond said medium and scanning said images with light sensitive means, impurities on said medium being defocused in said plane.

11. The method of claim 10 which further comprises moving said medium parallel to said plane, said scanning step comprising locating a plurality of closely spaced photodevices in said plane, emitting an electronic pulse each time the light illumination of one said device is substantially increased, and counting said pulses.

12. The method of claim 11 which further comprises blocking off the pulses of adjacent devices where one said device pulses, whereby when the image of one said colony illuminates a plurality of devices, only one pulse is counted.

References Cited

UNITED STATES PATENTS

| | | | |
|---|---|---|---|
| 3,206,606 | 9/1965 | Burgo et al. | 250—219 |
| 3,233,506 | 2/1966 | Hart et al. | 356—156 |
| 3,349,227 | 10/1967 | Martens et al. | 356—102 X |
| 3,415,997 | 12/1968 | Vinzelberg et al. | 250—218 |

FOREIGN PATENTS 1,030,742   5/1966   Great Britain.

WALTER STOLWEIN, Primary Examiner

U.S. Cl. X.R.

195—103.5; 356—244